US012775883B2

(12) United States Patent
Wolfe

(10) Patent No.: US 12,775,883 B2
(45) Date of Patent: Oct. 27, 2026

(54) ADAPTIVE MACHINE LEARNED COMPRESSED COMMUNICATION

(71) Applicant: Electronic Arts Inc., Redwood City, CA (US)

(72) Inventor: Alan Wolfe, San Clemente, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 98 days.

(21) Appl. No.: 18/895,927

(22) Filed: Sep. 25, 2024

(65) Prior Publication Data

US 2026/0084061 A1 Mar. 26, 2026

(51) Int. Cl.
*G06N 20/00* (2019.01)
*A63F 13/71* (2014.01)
*A63F 13/30* (2014.01)

(52) U.S. Cl.
CPC ............. *G06N 20/00* (2019.01); *A63F 13/71* (2014.09); *A63F 13/30* (2014.09); *H04L 2209/34* (2013.01)

(58) Field of Classification Search
None
See application file for complete search history.

(56) References Cited

U.S. PATENT DOCUMENTS 2,292,387 A 8/1942 Markey
2019/0095798 A1* 3/2019 Baker .................... G06N 3/088
2021/0099731 A1* 4/2021 Zhai ..................... H04N 19/147
2021/0273707 A1* 9/2021 Yoo ....................... H04L 1/0045
2022/0014447 A1* 1/2022 Kuo ..................... G06N 3/0464
2022/0368349 A1* 11/2022 Luo .................. H03M 13/3746

* cited by examiner

*Primary Examiner* — Dmitry Suhol
*Assistant Examiner* — Ishayu Singh
(74) *Attorney, Agent, or Firm* — Gray Ice Higdon

(57) ABSTRACT

This specification relates to methods of compression that utilise machine-learning. According to a first aspect of this specification, there is described a computer implemented method comprising: receiving, at a decoder and via a network, a first encoded representation of a set of input data and processing, by the decoder, the first encoded representation using a machine-learning decoder model to generate a first set of decoded data corresponding to the set of input data. The method further comprises processing, at the decoder, the first set of decoded data using a machine-learning encoder model to generate a second encoded representation of the set of input data. The machine-learning encoder model corresponds to an encoder-side machine-learning encoder model that was used to generate the first encoded representation. The method further comprises processing, at the decoder, the second encoded representation using the machine-learning decoder model to generate a second set of decoded data. The method further comprises comparing, at the decoder, the first set of decoded data to the second set of decoded data using an objective function, and updating, at the decoder, parameters of the machine-learning decoder model and/or machine learning encoder model based on the comparison of the first set of decoded data to the second set of decoded data.

20 Claims, 7 Drawing Sheets

ADAPTIVE MACHINE LEARNED COMPRESSED COMMUNICATION

FIELD

This specification relates to methods of compression that use machine-learning.

BACKGROUND

In the world of high-performance network programming, both in computer game development and beyond, there are techniques to help get better compression with lower bandwidth.

Examples of such techniques include pre-sharing a compression header, such as a Huffman table. This removes the overhead of the decompression details from the network message. As long as the encoder side and decoder side use the same header information, they will be able to communicate. This can reduce communication overhead.

Furthermore, as messages go through the encoder-decoder channel, a compression table is updated using the same logic on the sender-side and receiver-side deterministically, so that the compression header on each side remains synchronized, but adapts to the specific messages being sent. This allows the compression to adapt as the messages change over time.

SUMMARY

According to a first aspect of this specification, there is described a computer implemented method comprising: receiving, at a decoder and via a network, a first encoded representation of a set of input data and processing, by the decoder, the first encoded representation using a machine-learning decoder model to generate a first set of decoded data corresponding to the set of input data. The method further comprises processing, at the decoder, the first set of decoded data using a machine-learning encoder model to generate a second encoded representation of the set of input data. The machine-learning encoder model corresponds to an encoder-side machine-learning encoder model that was used to generate the first encoded representation. The method further comprises processing, at the decoder, the second encoded representation using the machine-learning decoder model to generate a second set of decoded data. The method further comprises comparing, at the decoder, the first set of decoded data to the second set of decoded data using an objective function, and updating, at the decoder, parameters of the machine-learning decoder model and/or machine learning encoder model based on the comparison of the first set of decoded data to the second set of decoded data.

The method may further comprise: processing, at an encoder, the set of input data using the encoder-side machine-learning encoder model to generate the first encoded representation; transmitting, from the encoder to the decoder via a network, the first encoded representation; and processing, at the encoder, the first encoded representation using an encoder-side machine-learning decoder model corresponding to the machine-learning decoder model to generate a third set of decoded data. The method may further comprise: comparing, at the encoder, the third set of decoded data to the set of input data using the objective function; and updating, at the encoder, parameters of the encoder-side machine-learning decoder model and/or encoder-side machine learning encoder model based on the comparison of the third set of decoded data to the set of input data.

The input data may in-game data representing one or more aspects of a current global game state of a computer game. The method may further comprise updating, based on the first set of decoded data, a local in-game state of a computer game running on hardware associated with the decoder. The method may further comprise, at the decoder-side: subsequent to updating the local in-game state of the computer game, generating, at the decoder, a hash of at least a part of the local in-game state; and transmitting, from the decoder to the encoder, the hash of at least a part of the local in-game state. The method may further comprise, at the encoder-side: determining, at the encoder, that the hash of at least a part of the local in-game state is different to a corresponding hash of the current global state of the computer game by at least a threshold amount; and in response to determining that the hash of at least a part of the local in-game state is different to the corresponding hash of the current global state of the computer game by at least the threshold amount, transmitting, from the encoder to the decoder, current values of parameters of an encoder-side machine-learning encoder model and/or an encoder-side machine-learning decoder model.

The method may further comprise, at the decoder-side: processing, by the decoder, local game state data using the machine-learning decoder model to generate an encoded representation of the local in-game state; and transmitting, from the decoder to the encoder via a network, the encoded representation of the local in-game state. The method may further comprise, at the encoder-side: processing, by the encoder, the encoded representation of the local in-game state using an encoder-side decoder model to generate a reconstruction of the local in-game state data; and updating, by the encoder, a global game state based on the reconstruction of the local in-game state data.

Updating, at the decoder, parameters of the machine-learning decoder model and/or machine learning encoder model based on the comparison of the first set of decoded data to the second set of decoded data may comprise: updating a proper subset of parameters of the machine-learning decoder model and/or machine learning encoder model while keeping values of parameters outside of the proper subset of parameters fixed.

The machine-learning encoder model and the machine-learning decoder model may together form an autoencoder model.

According to a further aspect of this specification, there is described a system comprising a decoder. The decoder comprises: one or more processors; and a memory. The memory stores computer-readable instructions that, when executed by the one or more processors of the decoder, cause the decoder to perform operations comprising: receiving, at the decoder and via a network, a first encoded representation of a set of input data; processing, by the decoder, the first encoded representation using a machine-learning decoder model to generate a first set of decoded data corresponding to the set of input data; processing, at the decoder, the first set of decoded data using a machine-learning encoder model to generate a second encoded representation of the set of input data, wherein the machine-learning encoder model corresponding to an encoder-side machine-learning encoder model that was used to generate the first encoded representation; processing, at the decoder, the second encoded representation using the machine-learning decoder model to generate a second set of decoded data; comparing, at the decoder, the first set of decoded data to the second set of decoded data using an objective function; and updating, at the decoder, parameters of the machine-learning decoder model and/or machine learning encoder model based on the comparison of the first set of decoded data to the second set of decoded data.

The system may further comprise an encoder. The encoder comprises: one or more processors; and a memory. The memory stores computer readable instructions that, when executed by the one or more processors of the encoder, cause the encoder to perform operations comprising: processing, at the encoder, the set of input data using the encoder-side machine-learning encoder model to generate the first encoded representation; transmitting, from the encoder to the decoder via a network, the first encoded representation; processing, at the encoder, the first encoded representation using an encoder-side machine-learning decoder model corresponding to the machine-learning decoder model to generate a third set of decoded data; comparing, at the encoder, the third set of decoded data to the set of input data using the objective function; and updating, at the encoder, parameters of the encoder-side machine-learning decoder model and/or encoder-side machine learning encoder model based on the comparison of the third set of decoded data to the set of input data.

The input data may be in-game data representing one or more aspects of a current global game state of a computer game. The computer-readable instructions further cause the decoder to perform operations comprising: updating, based on the first set of decoded data, a local in-game state of a computer game running on hardware associated with the decoder.

The computer-readable instructions at the decoder may further cause the decoder to perform operations comprising: subsequent to updating the local in-game state of the computer game, generating, at the decoder, a hash of at least a part of the local in-game state; and transmitting, from the decoder to the encoder, the hash of at least a part of the local in-game state. The computer-readable instructions at the encoder further cause the encoder to perform operations comprising: determining, at the encoder, that the hash of at least a part of the local in-game state is different to a corresponding hash of the current global state of the computer game by at least a threshold amount; and in response to determining that the hash of at least a part of the local in-game state is different to the corresponding hash of the current global state of the computer game by at least the threshold amount, transmitting, from the encoder to the decoder, current values of parameters of an encoder-side machine-learning encoder model and/or an encoder-side machine-learning decoder model.

The computer-readable instructions at the decoder may further cause the decoder to perform operations comprising: processing, by the decoder, local game state data using the machine-learning decoder model to generate an encoded representation of the local in-game state; and transmitting, from the decoder to the encoder via a network, the encoded representation of the local in-game state. The computer-readable instructions at the encoder may further cause the encoder to perform operations comprising: processing, by the encoder, the encoded representation of the local in-game state using an encoder-side decoder model to generate a reconstruction of the local in-game state data; and updating, by the encoder, a global game state based on the reconstruction of the local in-game state data.

Updating, at the decoder, parameters of the machine-learning decoder model and/or machine learning encoder model based on the comparison of the first set of decoded data to the second set of decoded data may comprise: updating a proper subset of parameters of the machine-learning decoder model and/or machine learning encoder model while keeping values of parameters outside of the proper subset of parameters fixed.

The machine-learning encoder model and the machine-learning decoder model together may form an autoencoder model.

According to a further aspect of this specification, there is described a non-transitory computer readable medium storing computer readable instructions that, when executed by a system comprising one or more processors, cause the system to perform operations comprising: receiving, at a decoder and via a network, a first encoded representation of a set of input data; processing, by the decoder, the first encoded representation using a machine-learning decoder model to generate a first set of decoded data corresponding to the set of input data; processing, at the decoder, the first set of decoded data using a machine-learning encoder model to generate a second encoded representation of the set of input data, wherein the machine-learning encoder model corresponding to an encoder-side machine-learning encoder model that was used to generate the first encoded representation; processing, at the decoder, the second encoded representation using the machine-learning decoder model to generate a second set of decoded data; comparing, at the decoder, the first set of decoded data to the second set of decoded data using an objective function; and updating, at the decoder, parameters of the machine-learning decoder model and/or machine learning encoder model based on the comparison of the first set of decoded data to the second set of decoded data.

The operations may further comprise: processing, at the encoder, the set of input data using the encoder-side machine-learning encoder model to generate the first encoded representation; transmitting, from the encoder to the decoder via a network, the first encoded representation; processing, at the encoder, the first encoded representation using an encoder-side machine-learning decoder model corresponding to the machine-learning decoder model to generate a third set of decoded data; comparing, at the encoder, the third set of decoded data to the set of input data using the objective function; and updating, at the encoder, parameters of the encoder-side machine-learning decoder model and/or encoder-side machine learning encoder model based on the comparison of the third set of decoded data to the set of input data.

The input data may be in-game data representing one or more aspects of a current global game state of a computer game and wherein the computer-readable instructions further cause the decoder to perform operations comprising: updating, based on the first set of decoded data, a local in-game state of a computer game running on hardware associated with the decoder.

The computer-readable instructions may further cause the decoder to perform operations comprising: subsequent to updating the local in-game state of the computer game, generating, at the decoder, a hash of at least a part of the local in-game state; and transmitting, from the decoder to the encoder, the hash of at least a part of the local in-game state. The computer-readable instructions may further cause the encoder to perform operations comprising: determining, at the encoder, that the hash of at least a part of the local in-game state is different to a corresponding hash of the current global state of the computer game by at least a threshold amount; and in response to determining that the hash of at least a part of the local in-game state is different to the corresponding hash of the current global state of the computer game by at least the threshold amount, transmitting, from the encoder to the decoder, current values of parameters of an encoder-side machine-learning encoder model and/or an encoder-side machine-learning decoder model.

The computer-readable instructions may further cause the decoder to perform operations comprising: processing, by the decoder, local game state data using the machine-learning decoder model to generate an encoded representation of the local in-game state; and transmitting, from the decoder to the encoder via a network, the encoded representation of the local in-game state. The computer-readable instructions may further cause the encoder to perform operations comprising: processing, by the encoder, the encoded representation of the local in-game state using an encoder-side decoder model to generate a reconstruction of the local in-game state data; and updating, by the encoder, a global game state based on the reconstruction of the local in-game state data.

Updating, at the decoder, parameters of the machine-learning decoder model and/or machine learning encoder model based on the comparison of the first set of decoded data to the second set of decoded data may comprise: updating a proper subset of parameters of the machine-learning decoder model and/or machine learning encoder model while keeping values of parameters outside of the proper subset of parameters fixed.

BRIEF DESCRIPTION OF THE DRAWINGS

Example embodiments will now be described by way of non-limiting example, with reference to the accompanying drawings, in which.

DETAILED DESCRIPTION

As machine learning continues to grow, it is finding uses in many areas. One such area is data compression. This specification describes systems, methods, and apparatus for applying machine learning to data compression over a communication channel. The systems, methods and apparatus described herein use a trained compression model comprising an encoder model and a decoder model on both the encoder-side and decoder-side(s) of a compression system.

The compression model is initially pre-trained on likely example data and the state of the model (also referred to as the "initial model") and is pre-shared between both sender (i.e., the encoder) and receiver (i.e., the decoder(s)) as a one-time communication cost. Such likely example data comprises a training dataset of examples that are similar to/relate to the expected data that will encoded by the compression model, e.g., data of the same/a similar type and/or taken from the same/a similar source. For example, for a compression model for compressing and decompressing game state data of a particular game or type of game (e.g., sports games, first-person shooter games, strategy games, or the like), the likely example data comprises examples of game state data from the particular game and/or type of game. Alternatively, for a compression model for compressing and decompressing images or video, the likely example data comprises example images or videos, e.g., generic images/videos or images/videos of a particular type that the compression model is specialising in. Alternatively, for a compression model for compressing and decompressing audio samples, the likely example data comprises example audio samples, e.g., generic audio samples or audio samples of a particular type that the compression model is specialising in (e.g., voice samples, classical music samples, rock samples, etc.).

Any relevant machine-learning training method known in the art may used to pre-train the compression model. For example, training methods based on applying an optimisation routine to a reconstruction loss between decoded data and input training example data may be used to train the model. The pre-training may be performed at the encoder-side. Once pre-trained, the initial model is shared by encoder with one or more decoders.

During use, as data is sent and received, the compression model is updated by training the model to adapt to the data being sent. The compression model is updated deterministically by both the encoder and decoder(s) (i.e., using the same random seed, same logic, etc.), so that both sides maintain the same model state, or substantially the same model state, over time. Examples of this update process are described herein in relation to FIG. 1B.

Figure 3:
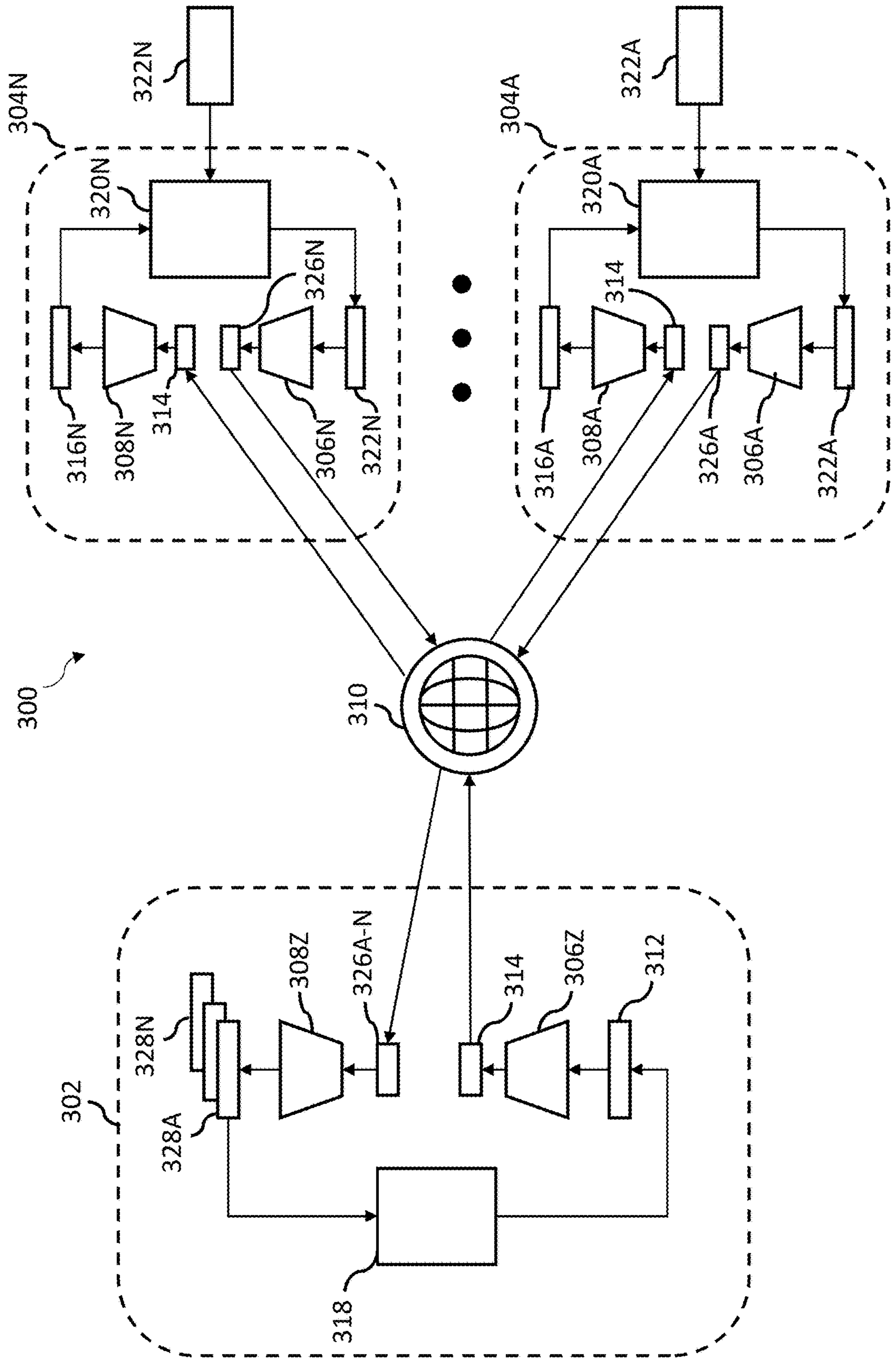
FIG. 3 shows a schematic overview of a computer gaming system.

As a concrete example, the data being transferred is compressed with an autoencoder, for example as described in relation to FIG. 3, where the first half takes the full-sized data and makes it into a smaller representation, also referred to as an encoded representation or an embedding. That smaller representation is the compressed data and is decompressed by the second half of the network. To use this for communication compression normally, the compressed data and the second half of the autoencoder would need to be transmitted to the receiver.

Instead, using the systems, methods and/or apparatus described herein, an autoencoder is trained on likely data. This trained autoencoder is pre-shared between the encoder and decoder for a one-time communication cost. The sender uses the sender-side copy of the encoder part of the autoencoder to encode chunks of data and send them to the receiver, which decodes them using the receiver-side copy of the decoder part of the autoencoder. Both sender and receiver update the weights of their respective copies of the autoencoder model with the new data through some pre-decided deterministic process.

In this manner, the encoding models can adapt to the data being transmitted to provide higher quality encoded representations (e.g., reduced loses, less noise, or the like), without the overhead of communicating model updates between the sender and receiver.

Figure 1A:
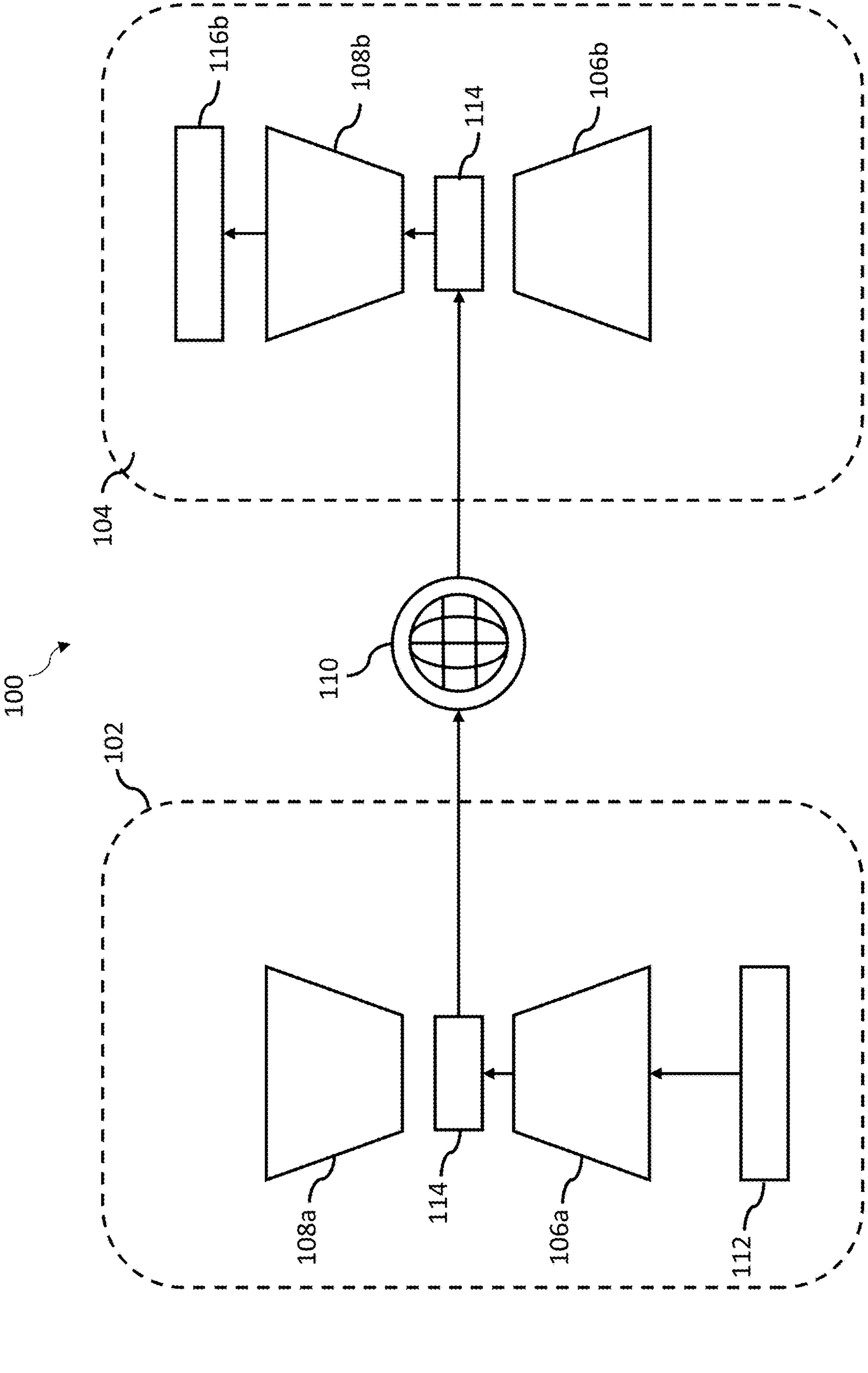
FIG. 1A shows an overview of an example encoding and decoding system.

FIG. 1A shows an overview of an encoding and decoding system 100. The system comprises an encoding apparatus/system 102 (also referred to herein as an encoder or sender) and a decoding apparatus/system 104 (also referred to herein as a decoder or receiver). The encoder 102 and decoder 104 each maintain respective copies of a machine-learning encoding model 106*a*, 106*b* and a machine-learning decoder model 108*a*, 108*b*. The encoder 102 and decoder 104 are, in some implementations, connected to a network 110, over which the encoder 102 and decoder 104 can communicate. The encoder 102 and decoder 104 are, in some examples, each a subsystem of a respective larger computing apparatus/system (not shown), e.g., a personal computer, a gaming console, a mobile computing device, a server, or the like.

The machine-learning encoder model 106*a*, 106*b* takes as input a set of input data 112 and processes it based on a set of learned parameters to generate a compressed representation 114 (also referred to herein as an encoded representation) of the input data 112. The compressed representation 114 is a lower dimensional representation of the input data 112, e.g., a lower dimensional vector or tensor than the input data 112. In some examples, the compressed representation 114 has a fixed size. Alternatively, in some examples variable neural compression is used in which the size of the compressed representation 114 is variable.

The decoder model 108*a*, 108*b* takes as input the compressed representation 114 and processes it based on a set of learned parameters to generate a reconstruction 116*a*, 116*b* of the input data 112 (also referred to herein as a set of decoded data). The reconstruction 116*a*, 116*b* of the input data 112 has the same dimension as the input data 112. In some implementations, the machine-learning encoder model 106*a*, 106*b* and the machine-learning decoder model 108*a*, 108*b* collectively form an autoencoder model, as described in further detail with respect to FIG. 2.

In use, the encoder 102 encodes input data 112 for transmission to the decoder 104 using the encoder-side machine-learning encoder model 106*a*. The encoder-side machine-learning encoder model 106*a* generates an encoded representation 114 of the input data 112. The encoder 102 communicates the encoded representation 114 to the decoder 104, e.g., by transmitting the encoded representation 114 over a network 110 as part of an encoded bitstream. The decoder 102 decodes the encoded representation 114 using the decoder-side machine-learning decoder model 108*b* to generate a reconstruction 116*b* of the input data 112. The reconstruction 116*b* of the input data 112 can then be used by the system/apparatus associated with the decoder 104.

The input data 112 can be any type of data for encoding. In some implementations, the input data 112 is computer game data, as described in relation to FIG. 3. The input data 112 is, in some implementations, image and/or video data, e.g., pixel data corresponding to at least a part of an image and/or at least a part of a sequence of images. The input data 112 is, in some implementations, audio data, e.g., spectral data representing audio. The input data 112 is, in some implementations, text data. Many other examples are possible. The input data 112 is, in some implementations, in the form of a vector, a tensor, or an array.

The encoder model 106*a*, 106*b* and/or decoder model 108*a*, 108*b* are, in some implementations, neural network models. Such neural network models can include one or more convolutional layers, one or more fully connected layers, one or more recurrent layers (such as long short-term memory, LSTM, layers), one or more transformer layers, one or more residual connections and/or the like. In some implementations, the machine-learning encoder model 106*a*, 106*b* and the machine-learning decoder model 108*a*, 108*b* jointly form an autoencoder model, as described in relation to FIG. 2.

Once decoded by the decoder 104, the reconstruction 116*b* of the input data 112 is used by the system/apparatus associated with the decoder 104 to perform some function. For example, the system/apparatus associated with the decoder 104 can be a gaming device (e.g., a personal computer, gaming console, or the like) and the reconstruction 116*b* of the input data 112 is used to update a game state on the gaming device, as described in relation to FIG. 3. Alternatively or additionally, the system/apparatus associated with the decoder 104 uses the reconstruction 116*b* of the input data 112 to generate audio and/or visual data, which is output to a user. Many other examples are possible.

In some implementations, the initial encoder model 106 and initial decoder model (also referred to herein as the "original encoder model" and "original decoder model") are shared between the encoder 102 and decoder 104, for example as a header message sent from the decoder 102 to the encoder 104. Alternatively, the initial encoder model and initial decoder model may always be stored at both the encoder 102 and decoder 104 and start from the same parameter values, i.e., be a predefined model at the start of every process.

While FIG. 1A has been illustrated with a single encoder model 106*a*, 106*b* and decoder model 108*a*, 108*b* in each side of the process, it will be appreciated that the encoder 102 and decoder 104 may each maintain multiple encoder 106*a*, 106*b* and decoder 108*a*, 108*b* models. For example, each encoder model 106*a*, 106*b* and its corresponding decoder 108*a*, 108*b* model are specialized in coding a particular type of data, e.g., game state data, audio data, visual data, or the like. Alternatively or additionally, the encoder 102 may maintain a respective encoder model 106*a* and decoder model 106*b* for each of a corresponding plurality of decoders 104, e.g., that are each running on a different user device.

Figure 1B:
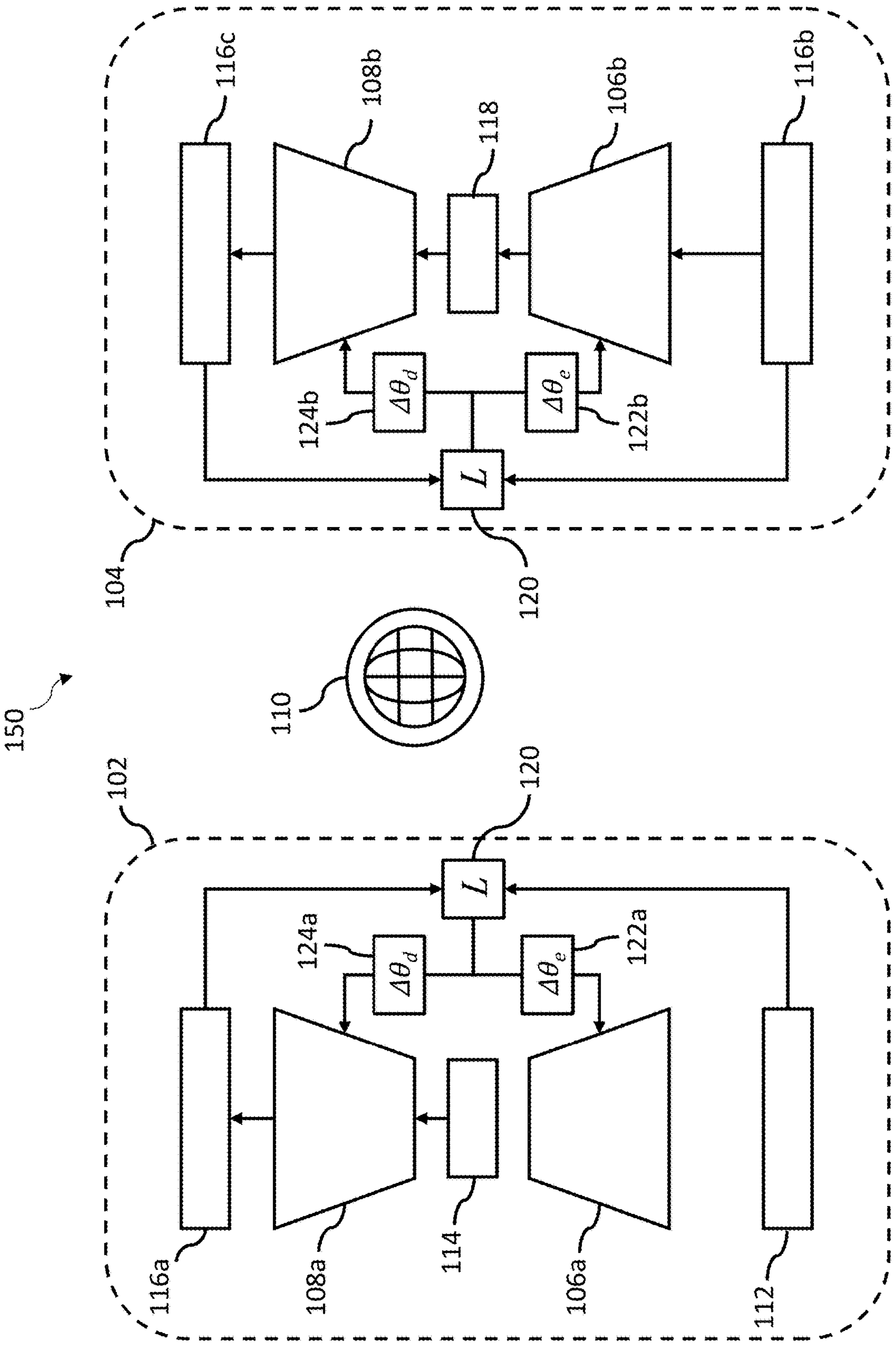
FIG. 1B shows an overview of an example method of updating an encoding and decoding system

FIG. 1B shows an overview of an example method 150 of updating an encoding and decoding system. The encoder 102 and decoder 104 update their respective copies of the machine-learning encoder model 106*a*, 106*b* and machine-learning decoder model 108*a*, 108*b* based on the input data 112 (for the encoder 102) and the reconstructed data 116*b* (for the decoder 104). The encoder 102 and decoder 104 both use the same update process (e.g., the same objective function 120 and optimization routine) to update their respective copies of the copies of the machine-learning encoder model 106*a*, 106*b* and machine-learning decoder model 108*a*, 108*b*. In this manner, the encoder-side copies of the machine-learning encoder model 106*a* and machine-learning decoder model 108*a* can adapt to data being encoded/decoded to provide higher quality encodings 114, without the need to transmit update information across the network 110 to the decoder 102. This can save network resources.

For example, in multiplayer computer games, a server may act as an encoder 102 of data relating to a game state and transmit the encoded game state to a plurality of gaming devices (e.g., personal computer, gaming consoles, etc.) that decode the encoded game state and cause it to be implemented on a local version of the game. By updating the decoder and encoder models locally, as described above, the server is not required to send frequent model updates to multiple gaming devices, thus saving a significant amount of bandwidth.

While FIG. 1B illustrates the encoder 102 and decoder 104 performing the updates themselves, it will be appreciated that the update process 150 may alternatively or additionally be performed by a system/apparatus associated with the encoder 102 (e.g., the sever on which the encoder is running or another server) and/or decoder 104 (e.g., a gaming device, a user device, or the like).

In further detail, on the encoder side, the encoder 102 inputs the compressed representation 114 into an encoder-side copy of the decoder model 108*a*, which processes it based on current values of parameters of the decoder model 108*a* to generate an encoder-side reconstruction 116*a* of the input data 114. The encoder-side reconstruction 116*a* of the input data 112 is then compared to the input data 112 using an objective function 120 (also referred to herein as a loss function) to generate updates 122*a*, 124*a* for the encoder model 106*a* and decoder model 108*a*, respectively. An optimisation routine, such as gradient descent or stochastic gradient descent with backpropagation or the like, can be applied to the objective function 120 to determine the parameter updates 122*a*, 124*a*. The loss/objective function 120 may be any suitable function known in the art, e.g., an L1 or L2 loss between the input data 112 and the encoder-side reconstruction 116*a*.

The determined parameter updates 122*a*, 124*a* are then applied to the encoder model 106*a* and decoder model 108*a* to generate an updated version of the encoder model 106*a* and decoder model 108*a* for the next batch of data to be encoded.

On the decoder side, the decoder inputs the reconstruction 116*b* of the input data 112 into the decoder-side copy of the encoder model 106*b*, which processes it to generate a second encoded representation 118 of the input data 112. The second encoded representation 118 of the input data 112 is input into the decoder-side copy of the decoder model 108*b*, which processes it based on current values of parameters of the decoder model 108*b* to generate a further decoder-side reconstruction 116*c* of the input data 114. The further decoder-side reconstruction 116*c* of the input data 112 is then compared to the first decoder-side reconstruction 116*b* of the input data 112 using the objective function 120 to generate updates 122*b*, 124*b* for the encoder model 106*a* and decoder model 108*a*, respectively. The objective function 120 is the same objective function used by the encoder 102. An optimisation routine, such as stochastic gradient descent with backpropagation or the like, can be applied to the objective function 120 to determine the parameter updates 122*b*, 124*b*. The optimisation routine and the objective function 120 used by the decoder 104 are the same routine and function used by the encoder 102, e.g., uses the same step size, batch size, etc.

The determined parameter updates 122*b*, 124*b* are then applied to the encoder model 106*b* and decoder model 108*b* to generate an updated version of the encoder model 106*b* and decoder model 108*b* for the next batch of data to be decoded.

In some implementations, updating the parameters of the encoder models 106*a*, 106*b* and/or decoder models 108*a*, 108*b* comprises using fine-tuning techniques. For example, only a subset of the parameters of the models are updated, with the remaining model parameters being kept fixed (also referred to as being "frozen"). In some such examples, the parameters of one or more final layers of a model (i.e., one or more layers preceding an output layer) are updated, with the remaining, earlier layers of the models being frozen. Alternative or additionally, one or more of the models may have parameters in one or more initial layers (i.e. one or more layers following the input layer) of a model updated, with the latter layers of the model fixed. Alternative or additionally, one or more of the models may have parameters in one or more intermediate layers (i.e. one or more layers between the input layer and the output layer) of a model updated, with the earlier and latter layers of the model fixed. For example, the decoder model 108*a*, 108*b* can update parameters of one or more of its final layers while keeping the remaining layers frozen, while the encoder 106*a*, 106*b* can update parameters of one or more of its initial layers while keeping the remaining layers frozen.

Alternatively, parameter efficient fine-tuning (PEFT) techniques can be used to update the encoder models 106*a*, 106*b* and/or decoder models 108*a*, 108*b*. Such techniques include, but are not limited to, low-rank adapters (LoRA), residual adapters, sequential adapters, and/or conditional adapters (CoDA).

The encoder 102, in some implementations, can apply multiple fine-tuning techniques (e.g., having different sets of parameters frozen, using different PEFT techniques, etc.) to generate a plurality of sets of candidate updates to the encoder models 106*a* and/or decoder model 108*a*. The encoder 102 can chose the set updates corresponding to the best performing technique as the updates to use for this update iteration. The fine-tuning technique resulting in the chosen set of updates can be signalled from the encoder 102 to the decoder 104. The decoder then uses the signalled fine-tuning technique to update the decoder-side models 106*b*, 108*b*.

In some implementations, the encoder-side updates are performed every time the encoder 102 encodes a set of input data, and the decoder-side updates are performed every time the decoder 104 decodes a set of data, allowing the encoder models 106*a*, 106*b* and decoder models 108*a*, 108*b* to continuously adapt to the data being encoded. In some alternative implementations, the updates on the encoder side and decoder side are performed after N sets of data have been encoded/decoded, where N>1, e.g., N=5, 10 or 20. In some such examples, the updates may be based on some or all the examples encoded/decoded since the last update, i.e., a batch of M sets of input data 112 and encoder-side reconstructed data 116*d* are used to update the encoder-side models 106*a*, 106*b* and a batch of M sets of decoder-side reconstructed data 116*a* and further decoder-side reconstructed data 116*b* are used to update the decoder-side models 108*a*, 108*b*, where M≤N.

In some implementations, the updates on the decoder side are performed in response to a signal from the encoder 102 instructing the decoder 104 to perform updates. The signal is, in some examples, in the form of a flag in the bitstream transmitted from the encoder 102 to the decoder 104 that contains the encoded representation 114. For example, the flag may be a binary flag in a header file of the bitstream, e.g., a value of "0" indicates that no update should be performed using the transmitted encoded representation, and a value of "1" indicates that an update should be performed using the transmitted encoded representation. In some such examples, the encoder 102 performs provisional updates every P-th time that data is encoded, where P≥1, and determines whether the provisional update is sufficiently different from the current model, e.g., comparing the absolute difference of the updated parameters and the current (i.e., un-updated) parameters to one or more threshold values. If the updates are sufficiently different from the previous model version, then the encoder 102 adopts the updated parameter values, and signals the decoder 104 to perform the same update process. If the updates are not sufficiently different from the previous model version, then the encoder 102 discards the updated values, and continues to use the un-updated parameter values.

For a lossless encoding scheme with guaranteed delivery, e.g., using a lossless compression technique alongside the Transmission Control Protocol (TCP), the method ensures that the encoder-side models and decoder-side models remain synchronized, without the need to transmit update information across the network.

However, for lossy compression techniques and/or non-guaranteed delivery (such as the User Datagram Protocol, UDP), the decoder-side models may drift from the encoder-side models over time, since they are updated based on reconstructed data 116*b* that may not exactly match the input data 112 and/or may have missing sets of encoded data 114. This can result in a degradation of the decoder 104 performance over time as the parameters of the encoder-side models 106*a*, 108*a* and decoder-side models 106*b*, 108*b* diverge.

To address this, the decoder 104 can periodically generate a hash of a current state of the system associated with the decoder 104 (a "decoder hash"), e.g., a hash of the game state of a computer game in a gaming system, a hash of a decoded image in an image decoding system, a hash of a decoded audio sample in an audio decoding system, etc. This hash is transmitted from the decoder 104 to the encoder 102 across the network 110. The encoder 102 receives the hash and compares it to a hash of a state of the system associated with the encoder 102 (an "encoder hash"), e.g., a hash of a part of a global game state in a gaming system, a hash of the original image corresponding to the decoded image, a hash of the original audio corresponding to the decoded audio, etc. If the difference between the decoder hash and the encoder hash is above a threshold value, the encoder causes transmission of information to the decoder 104 via the network 110 that allows the decoder 104 to re-create the encoder-side models 106*a*, 108*a*, e.g., a copy of the encoder-side models 106*a*, 108*a*, or a set of fine-tuning parameters for the original encoder model 106 and decoder model 108.

Alternatively, other types of synchronisation message and/or protocols can be used to determine whether the decoder-side models 106*b*, 108*b* have drifted sufficiently from the encoder-side models 106*a*, 106*b* to affect performance. In response to determining that the performance of the decoder models 106*a*, 106*b* have degraded beyond a threshold value, the encoder 102 transmits information that allows the decoder 104 to re-create the encoder-side models 106*a*, 108*a*.

In some implementations, the encoder 102 determines how often to perform the update process based on a server load of the a sever associated with the encoder. When the server load is high, the encoder 102 performs retraining of its models 106*a*, 108*b* at a lower rate than when the server load is low.

Figure 2:
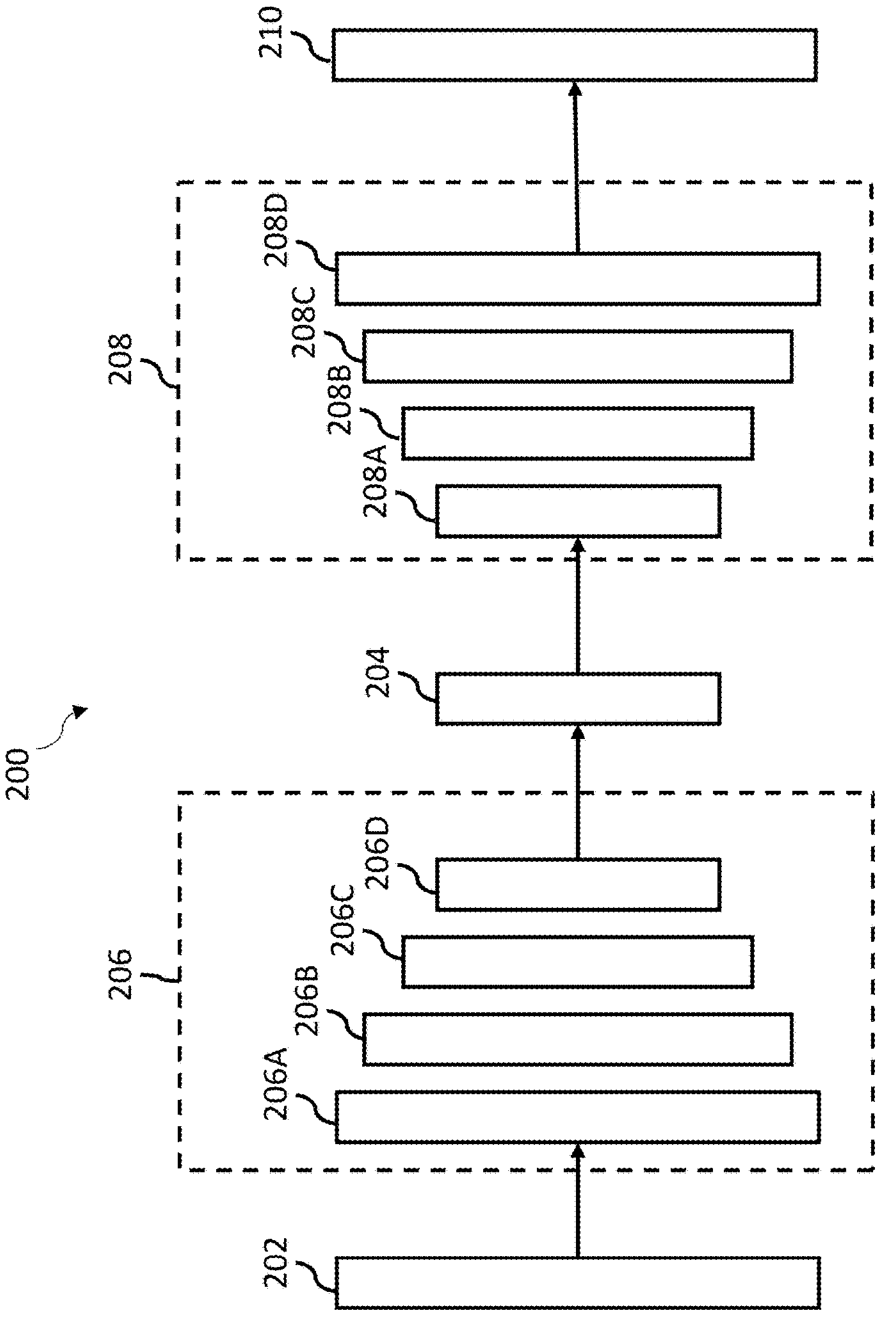
FIG. 2 shows an overview of an example autoencoder model.

FIG. 2 shows a schematic example of the operation of an autoencoder model 200. The autoencoder model comprises an encoder model 206 and a decoder model 208. The encoder model 206 takes a set of input data 202 and processes it through a plurality of parametrized encoder layers 206A-D to generate an encoded representation 204 (also referred to as an embedding or an embedding vector) of the input data 202. The encoded representation 204 has a lower dimensionality than the input data 202, i.e., is a lower-dimensional vector or tensor than the vector or tensor of the input data 202. The decoder model 208 takes the encoded representation 204 as input and processes the encoded representation 204 through a plurality of parametrized layers 208A-D to generate a reconstruction 210 of the input data 202. The reconstruction 210 of the input data 202 has the same dimension as the input data 202, e.g., is a vector or tensor of the same dimension as the input data 202.

In the example shown, the decoder model 208 and encoder model 206 both have the same number of layers, though in general the encoder model 206 and decoder model 208 can have different numbers and/or types of layers. For example, the decoder model 208 may have a simpler structure to the encoder model 206, e.g., fewer layers, fewer parameters/filters per layer, and/or simpler layer types.

The plurality of parametrized layers 206A-D of the encoder model 206 comprise one or more layers arranged to take a respective layer input (e.g., a vector or tensor) of a first dimension, and output a respective layer output (e.g., a vector or tensor) of a second dimension that is lower than the first dimension. Such layers are referred to herein as downsampling layers. The plurality of parametrized layers 206A-D of the encoder model 206 may comprise one or more convolutional layers, i.e., layers that implement one or more convolutional filters. One or more of the convolutional layers may implement a strided convolution with a stride greater than one in order to provide a downsampling layer. The plurality of parametrized layers 206A-D of the encoder model 206 may alternatively or additionally comprise one or more of: one or more fully connected layers; one or more transformer layers; one or more recurrent layers (e.g., long short-term memory layers or the like); and/or one or more residual connections.

The plurality of parametrized layers 208A-D of the decoder model 208 comprise one or more layers arranged to take a respective layer input (e.g., a vector or tensor) of a first dimension, and output a respective layer output (e.g., a vector or tensor) of a second dimension that is higher than the first dimension. Such layers are referred to herein as upsampling layers. The plurality of parametrized layers 208A-D of the decoder model 208 may comprise one or more convolutional layers, i.e., layers that implement one or more convolutional filters. One or more of the convolutional layers may implement a strided convolution with a fractional stride less than one in order to provide an upsampling layer. The plurality of parametrized layers 208A-D of the decoder model 208 may alternatively or additionally comprise one or more of: one or more fully connected layers; one or more transformer layers; one or more recurrent layers (e.g., long short-term memory layers or the like); and/or one or more residual connections.

FIG. 3 show a schematic overview of a computer gaming system 300 for multiplayer gaming and/or game streaming. The gaming system 300 comprises a server 302 and one or more (e.g., a plurality of) gaming devices 304A-N (e.g., personal computers, gaming consoles, mobile computing devices or the like) that are connected to the server 302 via a network 310. In some examples, the server 302 is also a gaming device, e.g., one of the gaming devices is acting as a host of the computer game. The server 302 maintains a global game state 318 for a computer game during the running of the game, e.g., locations of in-game objects and/or players, physics states of in-game objects, player character states and/or locations, environments states and/or the like. Each gaming device 304A-N maintains a respective local game state 320A-N of the computer game, which the gaming device uses to generate output to the player associated with that gaming device, e.g., visual output via a screen and/or audio output via speaker.

During gameplay, game data 312 representing at least a part of the global game state 318 of the computer game is encoded by a server-side encoder model 306Z to generate an encoded global game state 314, for example as described in relation to FIG. 1A and FIG. 2. The encoded global game state 314 is transmitted to one or more of the gaming devices 304A-N via the network 310. Each gaming device 308A-N decodes the received encoded global game state 314 to generate a respective reconstruction of the global game state 316A-N, for example as described in relation to FIG. 1A and FIG. 2. Each gaming device 304A-N then updates its respective local game state 320A-N based on its respective reconstruction of the global game state 316A-N. The local games states 320A-N are also updated based on respective player inputs 322A-N to the corresponding gaming device 304A-N, e.g., keyboard inputs, mouse inputs, handheld controller inputs, touchscreen inputs, motion senor inputs and/or the like.

The server 302 and gaming devices 304A-N each update their respective copies of the encoder 306 and decoder 308 models based on data transmitted from the server 302 to the gaming devices 304A-N, as described in relation to FIG. 1B.

To maintain the consistency of the global game state 318, game state data 324A-N from the local game states 320 is encoded using the respective decoder-side encoder models 306A-N of the player devices 304A-N to generate respective encoded local game states 326A-N. The respective encoded local game states 326A-N are transmitted to the server 302 via the network 310. The server 302 decodes the encoded local game states 326A-N from the player devices 304A-N using the sever-side decoder model 308Z to generate respective sets of decoded local game state data 328A-N. The server 302 uses the sets of decoded local game state data 328A-N to update the global game state 318.

The process is repeated throughout the running of the game.

The encoder models 306A-N, 306Z and decoder models 308A-N, 308Z are not updated based on the encoded local states 324A-N, since the local game states 320A-N are different for each gaming device 304A-N. Such updates would result in different models 306, 308 at each gaming device 304A-N and the server 302, degrading the performance of the system.

In the examples shown, the server 302 uses the same encoder model 306Z and decoder mode 308Z for all the gaming devices 304A-N in the same game session. However, in some implementations, the server 302 can in general use a different encoder model 306Z and decoder model 308Z (e.g., different parameter values and/or network structures) for each of the gaming devices 304A-N. This can be beneficial in situations where the gaming devices 304A-N have differing performances, e.g., on personal computers with different performances or in "cross play" situations, such as when some players are playing one type of gaming console, and some players are playing on a different type of gaming console and/or a personal computer.

In multiplayer games, new players often join a game that is already in progress. In such examples, the server 302 provides the joining player with a copy of the current versions of the encoder model 306Z and decoder model 308Z as part of the game initialisation process.

Figure 4:
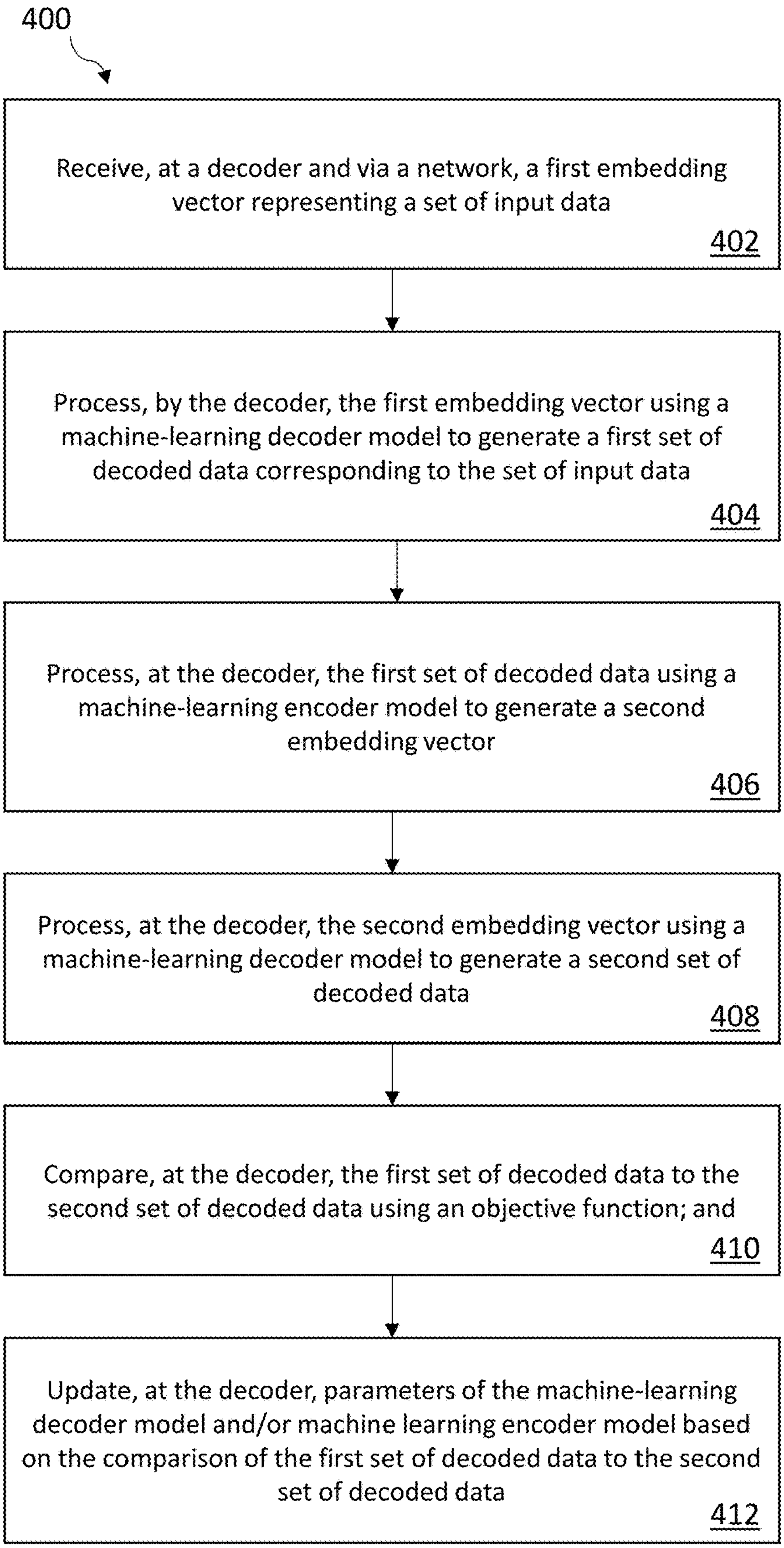
FIG. 4 shows a flow diagram of an example method for updating coding models at a decoder.

FIG. 4 shows a flow diagram of an example method 400 for updating coding models at a decoder. The method may be performed by a computing system/apparatus, such as the system/apparatus described in relation to FIG. 6. In some implementations, the method 400 is performed by each of one or more gaming systems, e.g., a personal computer, a games console, a mobile device or the like. For convenience, the method 500 is described as being performed by a decoder.

At operation 402, the decoder receives, via a network, a first encoded representation of a set input data. The first encoded representation may be in the form of an embedding vector or tensor. The first encoded representation is generated by an encoder, as described, for example, in relation to FIGS. 1A and 5.

In some examples, the input data is data representing at least a part of a game-state of a computer game that is being communicated from a host (e.g., a server running the game) to a gaming device on which the decoder is running, as described in relation to FIG. 3. Alternatively, the input data is data representing at least a part of a video and/or audio stream.

At operation 404, the decoder processes the first encoded representation using a machine-learning decoder model to generate a first set of decoded data corresponding to the set of input data. The decoder inputs the first encoded representation into the machine-learning decoder model, which processes it based on current values of parameters of the machine-learning decoder model to generate the first set of decoded data. The first set of decoded data is output from the machine-learning decoder model. The first set of decoded data may be a vector or tensor. The first decoded set of data has a higher dimension than the first encoded representation.

The first set of decoded data is used by a system/apparatus associated with the decoder to perform one or more actions. For example, in a gaming device, the gaming device uses the first set of decoded data to update a local version of a game state of the computer game. In some examples, the method may further comprise, subsequent to updating the local in-game state of the computer game, generating, at the decoder, a representation (e.g., a hash) of at least a part of the local in-game state. This representation is transmitted from the decoder to the encoder.

The decoder model can be any machine-leaning decoder model known in the art. For example, the decoder model can be the decoder part of an autoencoder model. The decoder model may be a neural network. The decoder model may comprise: one or more convolutional layers; one or more transformer layers; one or more fully connected layers; one or more recurrent layers; and/or one or more residual connections.

At operation 406, the decoder processes the first set of decoded data using a machine-learning encoder model to generate a second encoded representation. The machine-learning encoder model corresponds to (i.e., has the same structure and at least substantially the same parameter values) as the machine-learning encoder model used by the encoder to generate the first encoded representation of the set input data.

The encoder model can be any machine-leaning decoder model known in the art. For example, the encoder model can be the encoder part of an autoencoder model. The encoder model may be a neural network. The encoder model may comprise: one or more convolutional layers; one or more transformer layers; one or more fully connected layers; one or more recurrent layers; and/or one or more residual connections.

At operation 408, the decoder processes the second encoded representation using the machine-learning decoder model to generate a second set of decoded data. The second encoded representation is processed in the same manner as the first encoded representation, i.e., using the same decoder model parameters.

At operation 410, the decoder compares the first set of decoded data to the second set of decoded data using an objective function. The objective function may be based on a difference between the first set of decoded data to the second set of decoded data. For example, the objective function may be a L1 or L2 loss.

At operation 412, the decoder updates parameters of the machine-learning decoder model and/or machine learning encoder model based on the comparison of the first set of decoded data to the second set of decoded data. An optimisation routine, such as a gradient descent/ascent-based routine, may be applied to the objective function to determine the parameter updates.

The updated parameters may comprise weights and/or biases of the encoder model and/or decoder models. In some examples, only a proper subset of parameters of the encoder model and/or decoder model are updated. The remaining parameters of the encoder model and/or decoder model may be frozen. In some examples, one or more PEFT techniques are used to fine-tune the encoder and/or decoder model, e.g., LoRA.

Operations 406-412 of the method 400 are, in some examples, performed every time that data is decoded by the decoder. Alternatively, operations 406-412 of the method 400 are performed every N-th time that data is decoded, where N>1. In such examples, the updates may be based on a batch of decoded data (i.e., multiple sets of reconstructed input data). Alternatively, operations 406-412 of the method 400 are performed in response to a flag received in an encoded bitstream containing the first encoded representation that indicates an update should be performed, e.g., a binary flag.

In some examples, the method further comprises processing, by the decoder, local game state data using the machine-learning decoder model to generate an encoded representation of the local in-game state and transmitting, from the decoder to the encoder via a network, the encoded representation of the local in-game state. This may occur after or before the updates have been determined, as long as the ordering is known or communicated to the encoder.

In some examples, the method further comprises receiving, from the encoder and via the network, data indicative of replacement parameter values for the encoder model and/or decoder model. In response to receiving such data, the decoder replaces the corresponding decoder-side version of the encoder model and/or decoder model with an encoder model and/or decoder model with the replacement parameter values.

Figure 5:
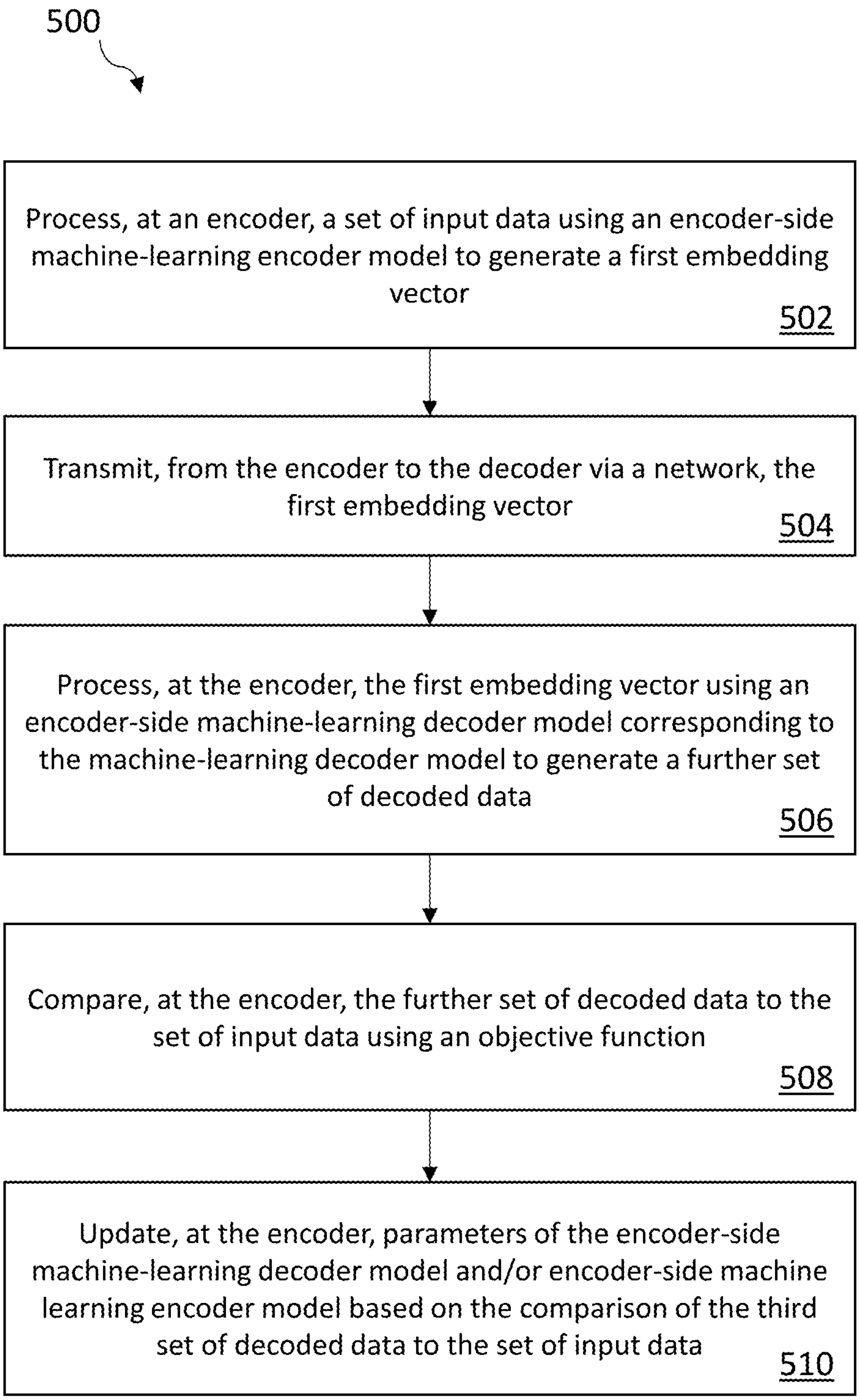
FIG. 5 shows a flow diagram of an example method for updating coding models at an encoder.

FIG. 5 shows a flow diagram of an example method for updating coding models at an encoder. The method may be performed by a computing system/apparatus, such as the system/apparatus described in relation to FIG. 6. In some implementations, the method 500 is performed by one or more servers hosting a multiplayer computer game and/or streaming a gaming service. For convenience, the method 500 is described as being performed by an encoder.

At operation 502, the encoder processes a set of input data using an encoder-side machine-learning encoder model to generate a first embedding vector. The input data may be in the form of a vector or tensor. The first encoded representation may be in the form of an embedding vector or tensor with a lower dimension than the input data. Operation 502 is described in further detail with respect to FIG. 1A.

In some examples, the input data is data representing at least a part of a game-state of a computer game that is being communicated from a host (e.g., a server running the game) to a gaming device on which the decoder is running, as described in relation to FIG. 3. Alternatively, the input data is data representing at least a part of a video and/or audio stream.

At operation 504, the encoder transmits the first embedding vector from the encoder to the decoder via a network. The first embedding vector may be transmitted as part of an encoded bitstream. The encoded bitstream may further comprise additional data, such as header files and/or other encoded data.

At operation 506, the encoder processes the first embedding vector using an encoder-side machine-learning decoder model to generate a further set of decoded data. The encoder-side machine-learning decoder model corresponds to the decoder-side machine-learning decoder model, for example having the same network structure and parameter values.

At operation 508, the encoder compares the further set of decoded data to the set of input data using an objective function. The objective function is the same objective function used by the decoder in the method of FIG. 4.

At operation 510, the encoder updates parameters of the encoder-side machine-learning decoder model and/or encoder-side machine learning encoder model based on the comparison of the third set of decoded data to the set of input data. The update process used at the decoder is the same as the update process used at the decoder in the method of FIG. 4.

Operations 506-510 of the method 500 are, in some examples, performed every time that input data is encoded by the encoder. Alternatively, operations 506-510 of the method 500 are performed every N-th time that input data is encoded, where N>1. In such examples, the updates may be based on a batch of input data (i.e., multiple sets of input data).

The method 500 may further comprises receiving, from the decoder and via a network, an encoded representation of a local in-game state at the decoder. The encoder processes the encoded representation of the local in-game state using the encoder-side decoder model to generate a reconstruction of the local in-game state data. The encoder the updates a global game state based on the reconstruction of the local in-game state data.

In some examples, the method 500 may further comprises receiving, from the decoder and via a network, a hash of at least a part of a local game state at the decoder. The encoder determines that the hash of at least a part of the local in-game state is different to a corresponding hash of the current global state of the computer game by at least a threshold amount. In response to determining that the hash of at least a part of the local in-game state is different to the corresponding hash of the current global state of the computer game by at least the threshold amount, the encoder transmits, from the encoder to the decoder and via the network, current values of parameters of an encoder-side machine-learning encoder model and/or an encoder-side machine-learning decoder model.

Figure 6:
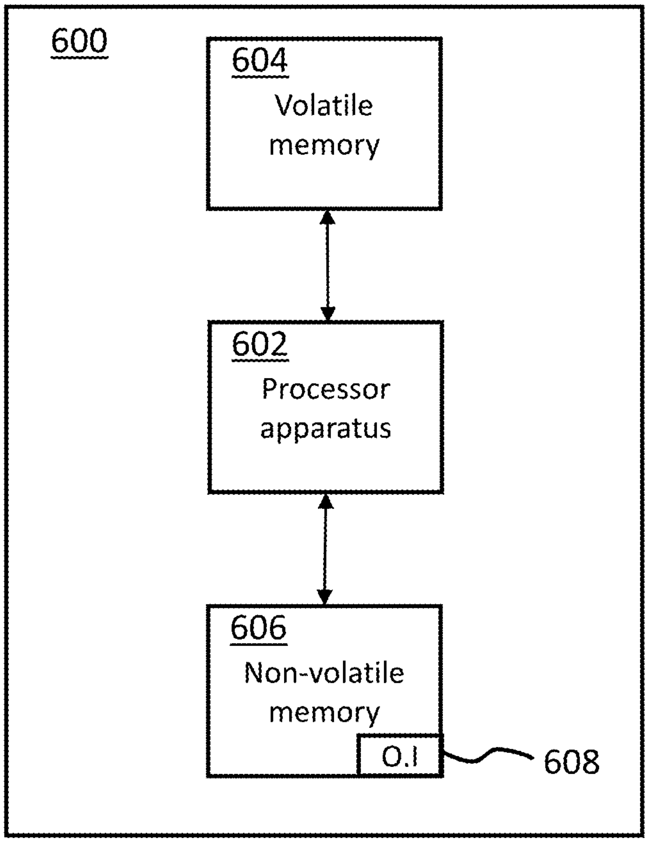
FIG. 6 shows a schematic example of a system/apparatus for performing any of the methods described herein.

FIG. 6 shows a schematic example of a system/apparatus 600 for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 600 comprises one or more processors 602. The one or more processors control operation of other components of the system/apparatus 600. The one or more processors 602 may, for example, comprise a general purpose processor. The one or more processors 602 may be a single core device or a multiple core device. The one or more processors 602 may comprise a Central Processing Unit (CPU) or a graphical processing unit (GPU). Alternatively, the one or more processors 602 may comprise specialised processing hardware, for instance a RISC processor or programmable hardware with embedded firmware. Multiple processors may be included.

The system/apparatus comprises a working or volatile memory 604. The one or more processors may access the volatile memory 604 in order to process data and may control the storage of data in memory. The volatile memory 604 may comprise RAM of any type, for example Static RAM (SRAM), Dynamic RAM (DRAM), or it may comprise Flash memory, such as an SD-Card.

The system/apparatus comprises a non-volatile memory 606. The non-volatile memory 606 stores a set of operation instructions 608 for controlling the operation of the processors 602 in the form of computer readable instructions. The non-volatile memory 606 may be a memory of any kind such as a Read Only Memory (ROM), a Flash memory or a magnetic drive memory.

The one or more processors 602 are configured to execute operating instructions 608 to cause the system/apparatus to perform any of the methods described herein. The operating instructions 608 may comprise code (i.e. drivers) relating to the hardware components of the system/apparatus 600, as well as code relating to the basic operation of the system/apparatus 600. Generally speaking, the one or more processors 602 execute one or more instructions of the operating instructions 608, which are stored permanently or semi-permanently in the non-volatile memory 606, using the volatile memory 604 to store temporarily data generated during execution of said operating instructions 608.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices, non-transitory computer readable media) comprising computer readable instructions that, when executed by a computer, such as that described in relation to FIG. 6, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A computer implemented method comprising:

receiving, at a decoder and via a network, a first encoded representation of a set of input data;

processing, by the decoder, the first encoded representation using a machine-learning decoder model to generate a first set of decoded data corresponding to the set of input data;

processing, at the decoder, the first set of decoded data using a machine-learning encoder model to generate a second encoded representation of the set of input data, wherein the machine-learning encoder model corresponding to an encoder-side machine-learning encoder model that was used to generate the first encoded representation;

processing, at the decoder, the second encoded representation using the machine-learning decoder model to generate a second set of decoded data;

comparing, at the decoder, the first set of decoded data to the second set of decoded data using an objective function; and updating, at the decoder, parameters of the machine-learning decoder model and/or machine learning encoder model based on the comparison of the first set of decoded data to the second set of decoded data.

2. The computer implemented method of claim 1, further comprising:

processing, at an encoder, the set of input data using the encoder-side machine-learning encoder model to generate the first encoded representation;

transmitting, from the encoder to the decoder via a network, the first encoded representation;

processing, at the encoder, the first encoded representation using an encoder-side machine-learning decoder model corresponding to the machine-learning decoder model to generate a third set of decoded data;

comparing, at the encoder, the third set of decoded data to the set of input data using the objective function; and updating, at the encoder, parameters of the encoder-side machine-learning decoder model and/or encoder-side machine learning encoder model based on the comparison of the third set of decoded data to the set of input data.

3. The computer implemented method of claim 1, wherein the input data is in-game data representing one or more aspects of a current global game state of a computer game and wherein the method further comprises:

updating, based on the first set of decoded data, a local in-game state of a computer game running on hardware associated with the decoder.

4. The computer implemented method of claim 3, wherein the method further comprises:

subsequent to updating the local in-game state of the computer game, generating, at the decoder, a hash of at least a part of the local in-game state;

transmitting, from the decoder to the encoder, the hash of at least a part of the local in-game state;

determining, at the encoder, that the hash of at least a part of the local in-game state is different to a corresponding hash of the current global game state of the computer game by at least a threshold amount; and in response to determining that the hash of at least a part of the local in-game state is different to the corresponding hash of the current global game state of the computer game by at least the threshold amount, transmitting, from the encoder to the decoder, current values of parameters of an encoder-side machine-learning encoder model and/or an encoder-side machine-learning decoder model.

5. The computer implemented method of claim 3, further comprising:

processing, by the decoder, local game state data using the machine-learning decoder model to generate an encoded representation of the local in-game state;

transmitting, from the decoder to the encoder via a network, the encoded representation of the local in-game state;

processing, by the encoder, the encoded representation of the local in-game state using an encoder-side decoder model to generate a reconstruction of the local in-game state data; and updating, by the encoder, a global game state based on the reconstruction of the local in-game state data.

6. The method of claim 1, wherein updating, at the decoder, parameters of the machine-learning decoder model and/or machine learning encoder model based on the comparison of the first set of decoded data to the second set of decoded data comprises:

updating a proper subset of parameters of the machine-learning decoder model and/or machine learning encoder model while keeping values of parameters outside of the proper subset of parameters fixed.

7. The computer implemented method of claim 1, wherein the machine-learning encoder model and the machine-learning decoder model together form an autoencoder model.

8. A system comprising:

a decoder comprising:

one or more processors; and a memory, the memory storing computer-readable instructions that, when executed by the one or more processors of the decoder, cause the decoder to perform operations comprising:

receiving, at the decoder and via a network, a first encoded representation of a set of input data; and processing, by the decoder, the first encoded representation using a machine-learning decoder model to generate a first set of decoded data corresponding to the set of input data;

processing, at the decoder, the first set of decoded data using a machine-learning encoder model to generate a second encoded representation of the set of input data, wherein the machine-learning encoder model corresponding to an encoder-side machine-learning encoder model that was used to generate the first encoded representation;

processing, at the decoder, the second encoded representation using the machine-learning decoder model to generate a second set of decoded data;

comparing, at the decoder, the first set of decoded data to the second set of decoded data using an objective function; and updating, at the decoder, parameters of the machine-learning decoder model and/or machine learning encoder model based on the comparison of the first set of decoded data to the second set of decoded data.

9. The system of claim 8, wherein the system further comprises:

an encoder comprising:

one or more processors; and a memory, the memory comprising computer-readable instructions that, when executed by the one or more processors of the encoder, cause the encoder to perform operations comprising:

processing, at the encoder, the set of input data using the encoder-side machine-learning encoder model to generate the first encoded representation;

transmitting, from the encoder to the decoder via a network, the first encoded representation;

processing, at the encoder, the first encoded representation using an encoder-side machine-learning decoder model corresponding to the machine-learning decoder model to generate a third set of decoded data;

comparing, at the encoder, the third set of decoded data to the set of input data using the objective function; and updating, at the encoder, parameters of the encoder-side machine-learning decoder model and/or encoder-side machine learning encoder model based on the comparison of the third set of decoded data to the set of input data.

10. The system of claim 9, wherein the input data is in-game data representing one or more aspects of a current global game state of a computer game and wherein the computer-readable instructions further cause the decoder to perform operations comprising:

updating, based on the first set of decoded data, a local in-game state of a computer game running on hardware associated with the decoder.

11. The system of claim 10, wherein the computer-readable instructions further cause the decoder to perform operations comprising:

subsequent to updating the local in-game state of the computer game, generating, at the decoder, a hash of at least a part of the local in-game state; and transmitting, from the decoder to the encoder, the hash of at least a part of the local in-game state;

wherein the computer-readable instructions further cause the encoder to perform operations comprising:

determining, at the encoder, that the hash of at least a part of the local in-game state is different to a corresponding hash of the current global game state of the computer game by at least a threshold amount; and in response to determining that the hash of at least a part of the local in-game state is different to the corresponding hash of the current global game state of the computer game by at least the threshold amount, transmitting, from the encoder to the decoder, current values of parameters of an encoder-side machine-learning encoder model and/or an encoder-side machine-learning decoder model.

12. The system of claim 10, wherein the computer-readable instructions further cause the decoder to perform operations comprising:

processing, by the decoder, local game state data using the machine-learning decoder model to generate an encoded representation of the local in-game state; and transmitting, from the decoder to the encoder via a network, the encoded representation of the local in-game state; and wherein the computer-readable instructions further cause the encoder to perform operations comprising:

processing, by the encoder, the encoded representation of the local in-game state using an encoder-side decoder model to generate a reconstruction of the local in-game state data; and updating, by the encoder, a global game state based on the reconstruction of the local in-game state data.

13. The system of claim 8, wherein updating, at the decoder, parameters of the machine-learning decoder model and/or machine learning encoder model based on the comparison of the first set of decoded data to the second set of decoded data comprises:

updating a proper subset of parameters of the machine-learning decoder model and/or machine learning encoder model while keeping values of parameters outside of the proper subset of parameters fixed.

14. The system of claim 8, wherein the machine-learning encoder model and the machine-learning decoder model together form an autoencoder model.

15. A non-transitory computer-readable medium storing instructions that, when executed by a system comprising one or more processors, cause the system to perform operations comprising:

receiving, at a decoder and via a network, a first encoded representation of a set of input data;

processing, by the decoder, the first encoded representation using a machine-learning decoder model to generate a first set of decoded data corresponding to the set of input data;

processing, at the decoder, the first set of decoded data using a machine-learning encoder model to generate a second encoded representation of the set of input data, wherein the machine-learning encoder model corresponding to an encoder-side machine-learning encoder model that was used to generate the first encoded representation;

processing, at the decoder, the second encoded representation using the machine-learning decoder model to generate a second set of decoded data;

comparing, at the decoder, the first set of decoded data to the second set of decoded data using an objective function; and updating, at the decoder, parameters of the machine-learning decoder model and/or machine learning encoder model based on the comparison of the first set of decoded data to the second set of decoded data.

16. The non-transitory computer-readable medium of claim 15, wherein the operations further comprise:

processing, at the encoder, the set of input data using the encoder-side machine-learning encoder model to generate the first encoded representation;

transmitting, from the encoder to the decoder via a network, the first encoded representation;

processing, at the encoder, the first encoded representation using an encoder-side machine-learning decoder model corresponding to the machine-learning decoder model to generate a third set of decoded data;

comparing, at the encoder, the third set of decoded data to the set of input data using the objective function; and updating, at the encoder, parameters of the encoder-side machine-learning decoder model and/or encoder-side machine learning encoder model based on the comparison of the third set of decoded data to the set of input data.

17. The non-transitory computer-readable medium of claim 15, wherein the input data is in-game data representing one or more aspects of a current global game state of a computer game and wherein the computer-readable instructions further cause the decoder to perform operations comprising:

updating, based on the first set of decoded data, a local in-game state of a computer game running on hardware associated with the decoder.

18. The non-transitory computer-readable medium of claim 17, wherein the computer-readable instructions further cause the decoder to perform operations comprising:

subsequent to updating the local in-game state of the computer game, generating, at the decoder, a hash of at least a part of the local in-game state; and transmitting, from the decoder to the encoder, the hash of at least a part of the local in-game state;

wherein the computer-readable instructions further cause the encoder to perform operations comprising:

determining, at the encoder, that the hash of at least a part of the local in-game state is different to a corresponding hash of the current global game state of the computer game by at least a threshold amount; and in response to determining that the hash of at least a part of the local in-game state is different to the corresponding hash of the current global game state of the computer game by at least the threshold amount, transmitting, from the encoder to the decoder, current values of parameters of an encoder-side machine-learning encoder model and/or an encoder-side machine-learning decoder model.

19. The non-transitory computer-readable medium of claim 17, wherein the computer-readable instructions further cause the decoder to perform operations comprising:

processing, by the decoder, local game state data using the machine-learning decoder model to generate an encoded representation of the local in-game state; and transmitting, from the decoder to the encoder via a network, the encoded representation of the local in-game state; and wherein the computer-readable instructions further cause the encoder to perform operations comprising:

processing, by the encoder, the encoded representation of the local in-game state using an encoder-side decoder model to generate a reconstruction of the local in-game state data; and updating, by the encoder, a global game state based on the reconstruction of the local in-game state data.

20. The non-transitory computer-readable medium of claim 15, wherein updating, at the decoder, parameters of the machine-learning decoder model and/or machine learning encoder model based on the comparison of the first set of decoded data to the second set of decoded data comprises:

updating a proper subset of parameters of the machine-learning decoder model and/or machine learning encoder model while keeping values of parameters outside of the proper subset of parameters fixed.

* * * * *